UNITED STATES PATENT OFFICE.

KARL SCHIRMACHER AND HEINRICH ELVERT, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

BROWN AZO DYESTUFFS.

1,076,321.  Specification of Letters Patent.  Patented Oct. 21, 1913.

No Drawing.  Application filed January 2, 1913.  Serial No. 739,881.

*To all whom it may concern:*

Be it known that we, KARL SCHIRMACHER, Ph. D., chemist, and HEINRICH ELVERT, Ph. D., chemist, citizens of the Empire of Germany, residing at Höchst-on-the-Main, Germany, have invented certain new and useful Improvements in New Brown Azo Dyestuffs, of which the following is a specification.

We have found that valuable azo dyestuffs are obtained by causing a diazo compound of an aromatic amino-sulfid to act upon naphthalene-2-arylamino-8-oxy-6-sulfonic acid. The dyestuffs thus obtained are brown powders, more readily soluble in hot than in cold water to a brown solution, and dyeing wool fast brown tints.

The constitution of said new dyestuffs corresponds to the formula:

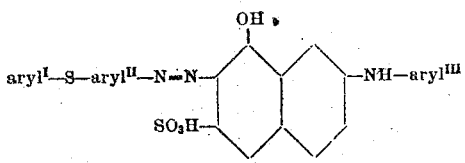

wherein aryl$^I$, aryl$^{II}$ and aryl$^{III}$ mean aromatic residues. In these dyestuffs the hydrogen atom of the sulfo group may, of course, be replaced by a metal. On reducing the dyestuffs with tin and hydrochloric acid, they are split up into aromatic aminosulfids and into naphthalene-2-arylamino-7-amino-8-oxy-6-sulfonic acid. Their alkali salts are more readily soluble in hot than in cold water and give a brown solution.

The following example illustrates the invention, the parts being by weight: 21.5 parts of para-tolyl-para-aminophenylsulfid, obtainable by reducing the para-tolyl-para-aminophenylsulfoxid, produced by condensing an aromatic sulfinic acid with an aromatic base (see *Berliner Berichte* vol. 36 I page 107 and following), are diazotized with 60 parts of hydrochloric acid of 20° Bé. specific gravity and 7 parts of sodium nitrite, and the diazo solution, after it has been filtered, is introduced, while stirring, into a solution of 35 parts of naphthalene-2-phenylamino-8-oxy-6-sulfonic acid and 70 parts of calcined sodium-carbonate. After the mixture has been stirred for several hours, it is heated to 60-70° C., whereupon a small quantity of common salt is added and the sodium salt of the dyestuff is isolated by filtration. The dyestuff thus obtained forms, when dry, a brownish-black powder, dissolving in water to a reddish-brown solution and dyeing wool fast brown tints. It has the constitution:

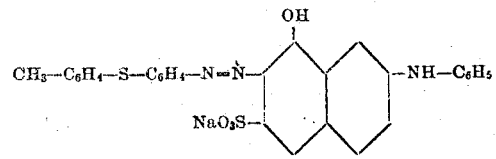

and yields, on being split up with tin and hydrochloric acid, p-aminophenyl-p-tolyl-sulfid and naphthalene-2-phenylamino-7-amino-8-oxy-6-sulfonic acid.

Having now described our invention what we claim is:

1. As new products, the azo dyestuffs the constitution of which corresponds to the general formula:

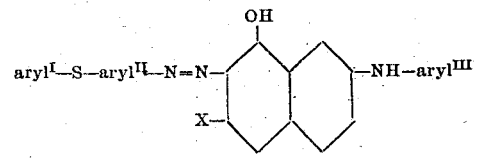

wherein aryl$^I$, aryl$^{II}$ and aryl$^{III}$ mean aromatic residues and X means a sulfo group, said dyestuffs being dark-brown powders, readily soluble in water to a brown solution, dyeing wool fast brown tints, and splitting up, when treated with tin and hydrochloric acid, into p-arylamino-arylsulfid and naphthalene-2-arylamino-7-amino-8-oxy-6-sulfonic acid.

2. As a new product, the azo dyestuff of the constitution:

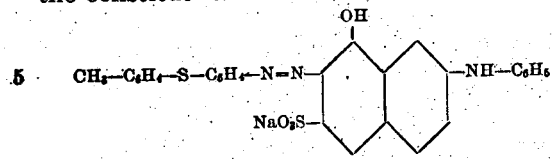

being a brown powder, readily soluble in hot water, dyeing wool fast brown tints, and splitting up, when treated with tin and hydrochloric acid, into para-aminophenyl-para-tolylsulfid and naphthalene-2-phenyl-amino-7-amino-8-oxy-6-sulfonic acid.

In testimony whereof, we affix our signatures in presence of two witnesses.

KARL SCHIRMACHER.
HEINRICH ELVERT.

Witnesses:
JEAN GRUND,
CARL GRUND.